United States Patent [19]

Butler et al.

[11] 4,428,706
[45] Jan. 31, 1984

[54] INTERLOCK SELECTOR CONTROL VALVE FOR ROUND BALE WAGON

[75] Inventors: L. Dennis Butler, Kingsburg; Alan R. Askov, Fresno, both of Calif.

[73] Assignee: Sperry Corporation, New Holland, Pa.

[21] Appl. No.: 276,571

[22] Filed: Jun. 23, 1981

[51] Int. Cl.³ .......................... A01D 87/12; F15C 3/02
[52] U.S. Cl. .................... 414/24.5; 91/536; 414/473; 414/501
[58] Field of Search .............. 414/24.5, 24.6, 111, 414/469, 472, 473, 501, 502, 503, 505, 551, 552, 555, 556, 557, 558, 618, 730, 910, 911; 91/536

[56] References Cited

U.S. PATENT DOCUMENTS

| | | | |
|---|---|---|---|
| 3,705,631 | 12/1972 | Seaberg | 91/536 X |
| 3,927,771 | 12/1975 | Butler et al. | 414/501 X |
| 4,329,101 | 5/1982 | Green et al. | 414/24.5 |
| 4,358,235 | 11/1982 | Butler et al. | 414/24.5 |
| 4,360,302 | 11/1982 | Askov et al. | 414/555 X |

FOREIGN PATENT DOCUMENTS 1282419  7/1972  United Kingdom .................. 91/536

*Primary Examiner*—Robert J. Spar
*Assistant Examiner*—Janice Krizek

*Attorney, Agent, or Firm*—Larry W. Miller; Darrell F. Marquette; Frank A. Seemar

[57] ABSTRACT

A control valve for the hydraulic system of a round bale wagon is disclosed wherein the valve spool is selectively positionable between a cross conveyor mode and a pusher mode and also provides a hydraulic interlock for the operation of the load bed to pivotally rotate for the unloading of bales therefrom. Movement of the valve spool between the cross conveyor and the pusher modes effects a selection of the operation of the bale handling mechanism to either convey bales laterally across the load bed or rearwardly on the load bed. The provision of a hydraulic interlock prevents the operation of the load bed to pivotally rotate the forward end above the frame of the bale wagon and unload accumulated bales therefrom, unless both the cross conveyor and the bale pickup are in a position that would not interfere with the movement of the load bed and, therefore, prevent damage thereto. Although the pusher advance mechanism could be positioned in an interferring position with respect to the tilting load bed, the massive size of these two members prevents any substantial damage, should they impact with one another; however, the pusher advance mechanism is positionable in a non-interferring position relative to the load bed.

6 Claims, 16 Drawing Figures

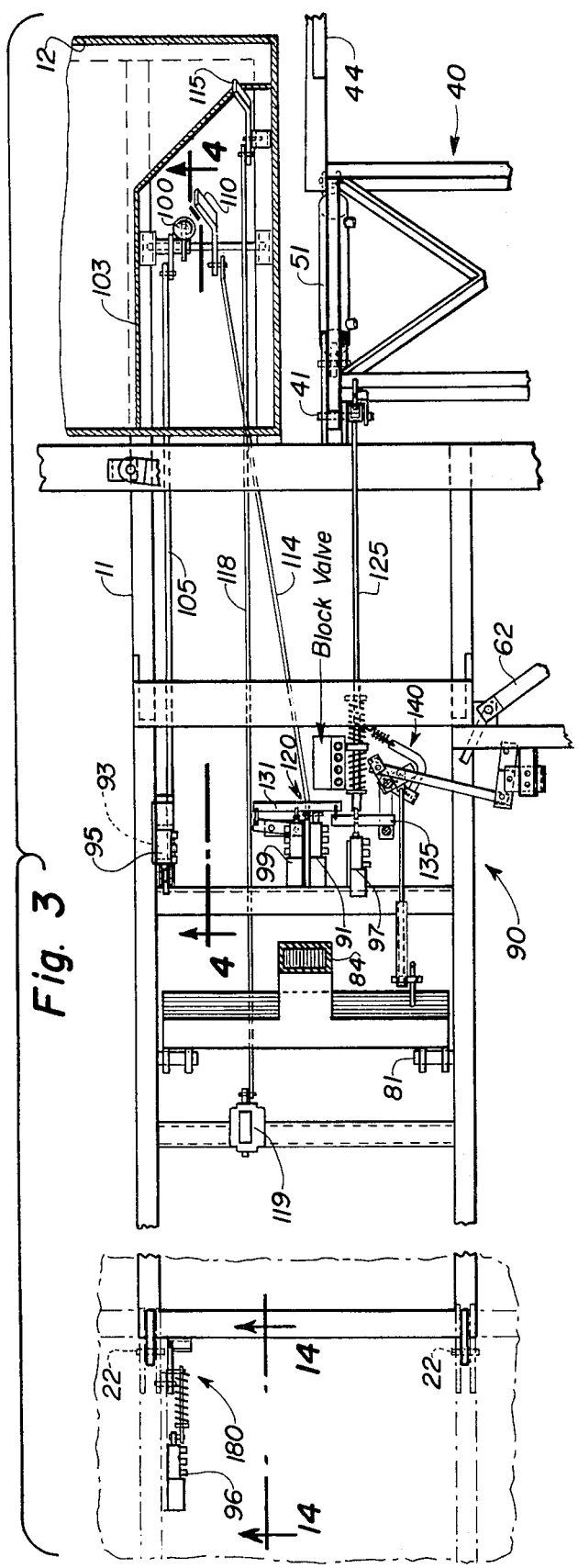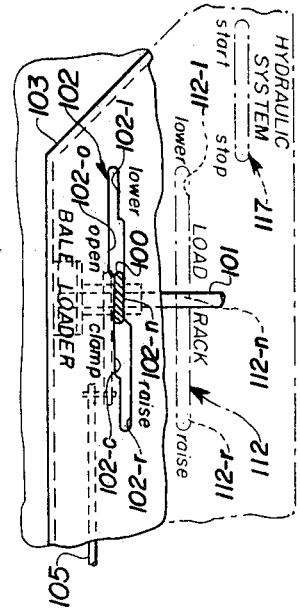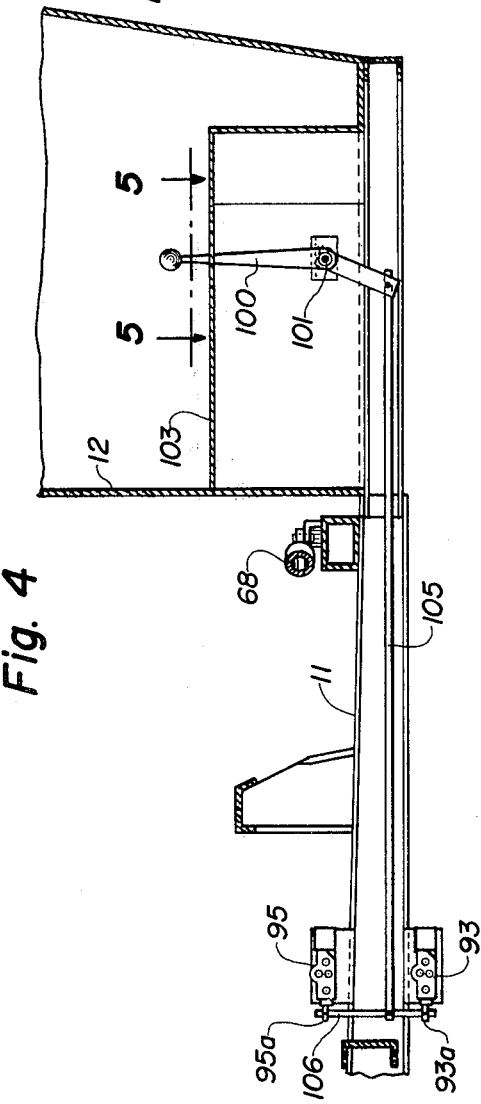

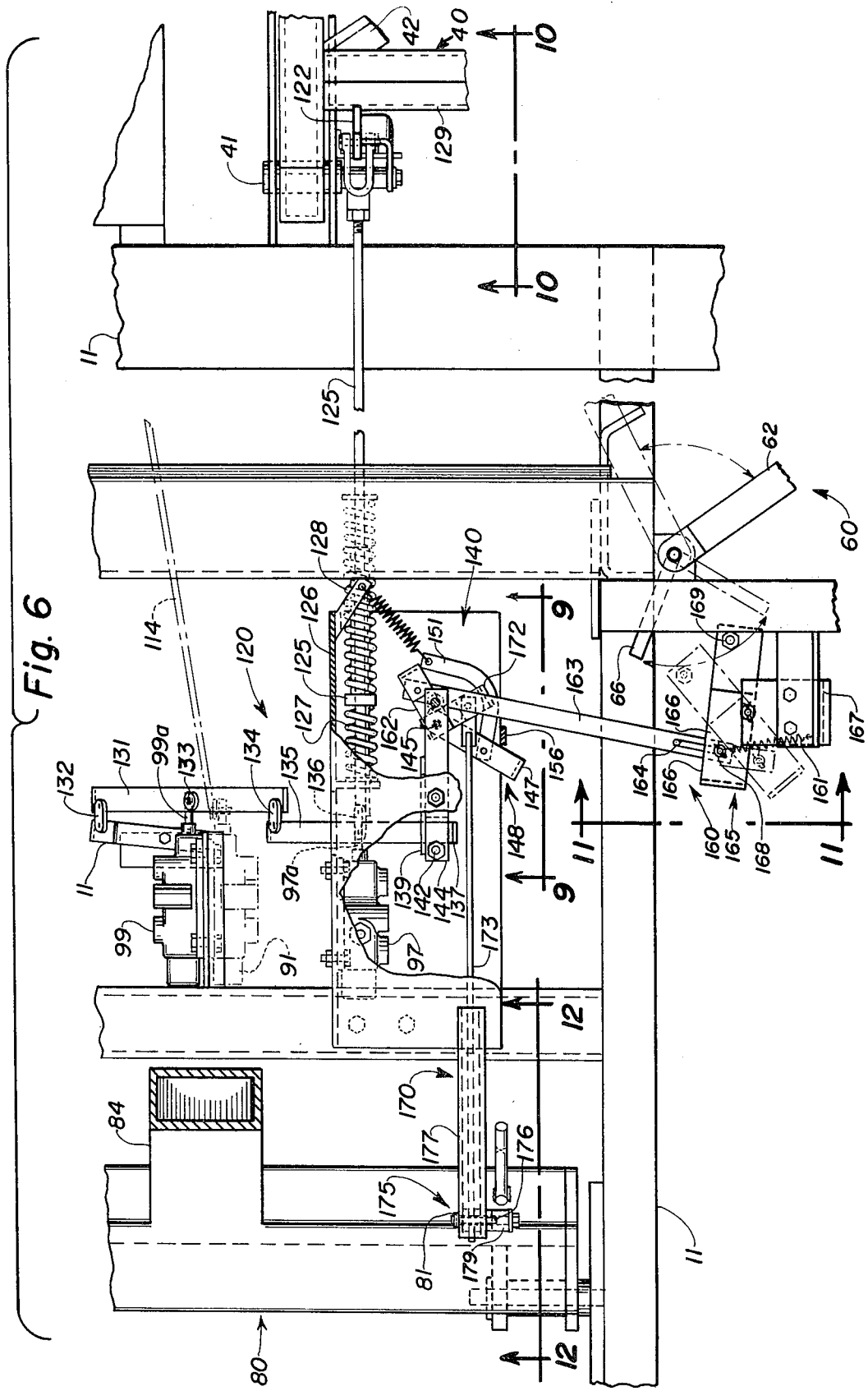

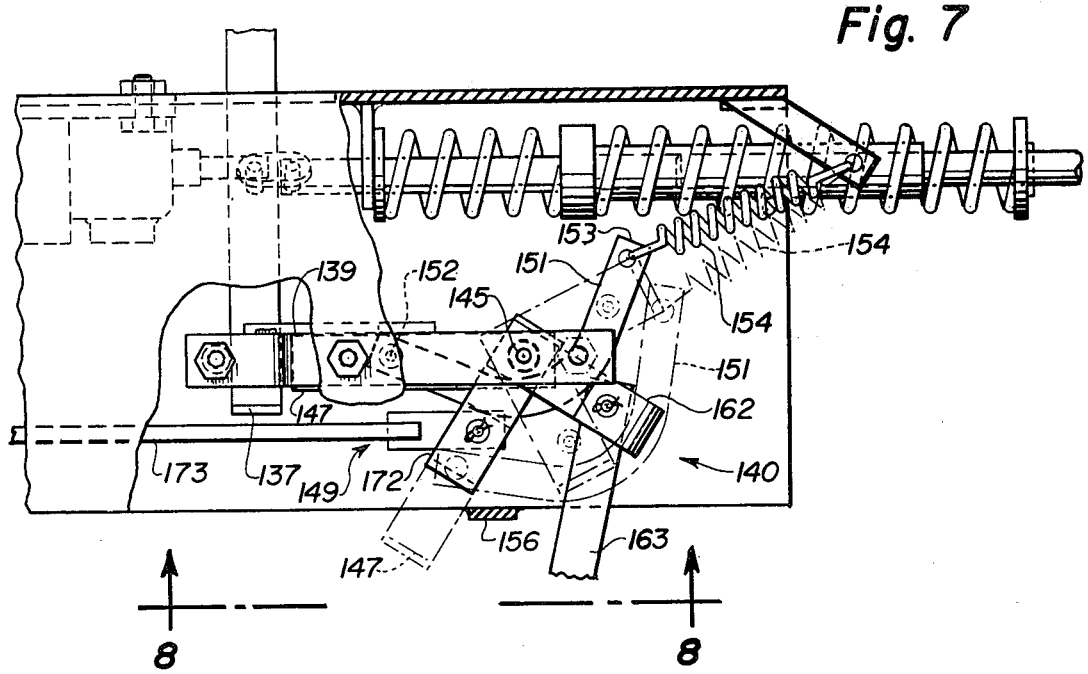
Fig. 7
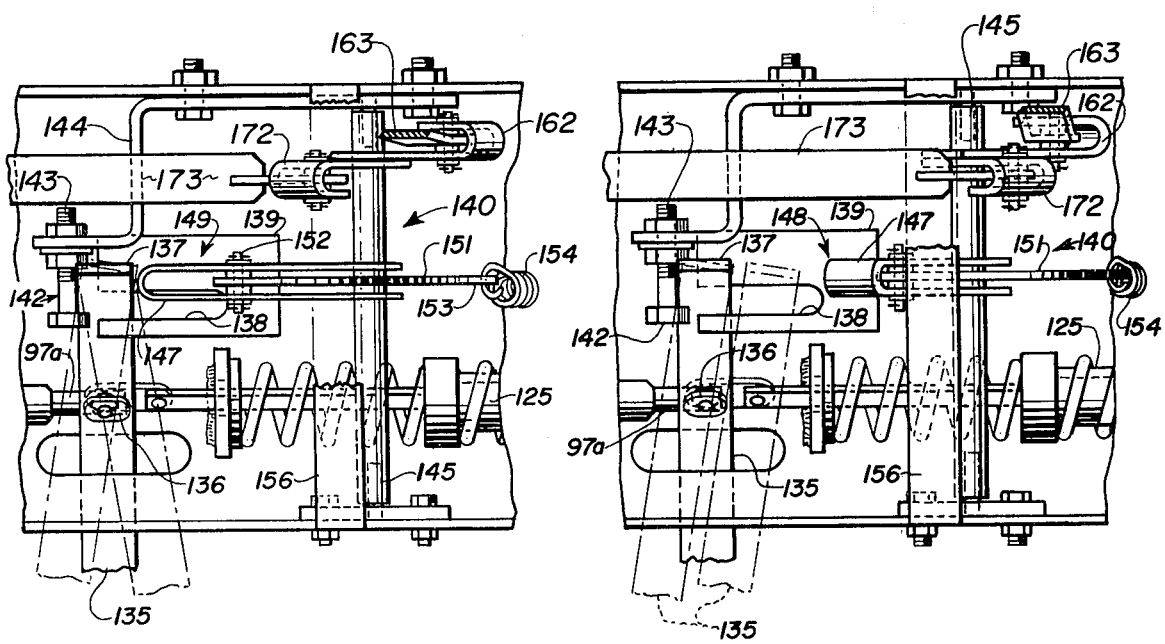
Fig. 8
Fig. 9

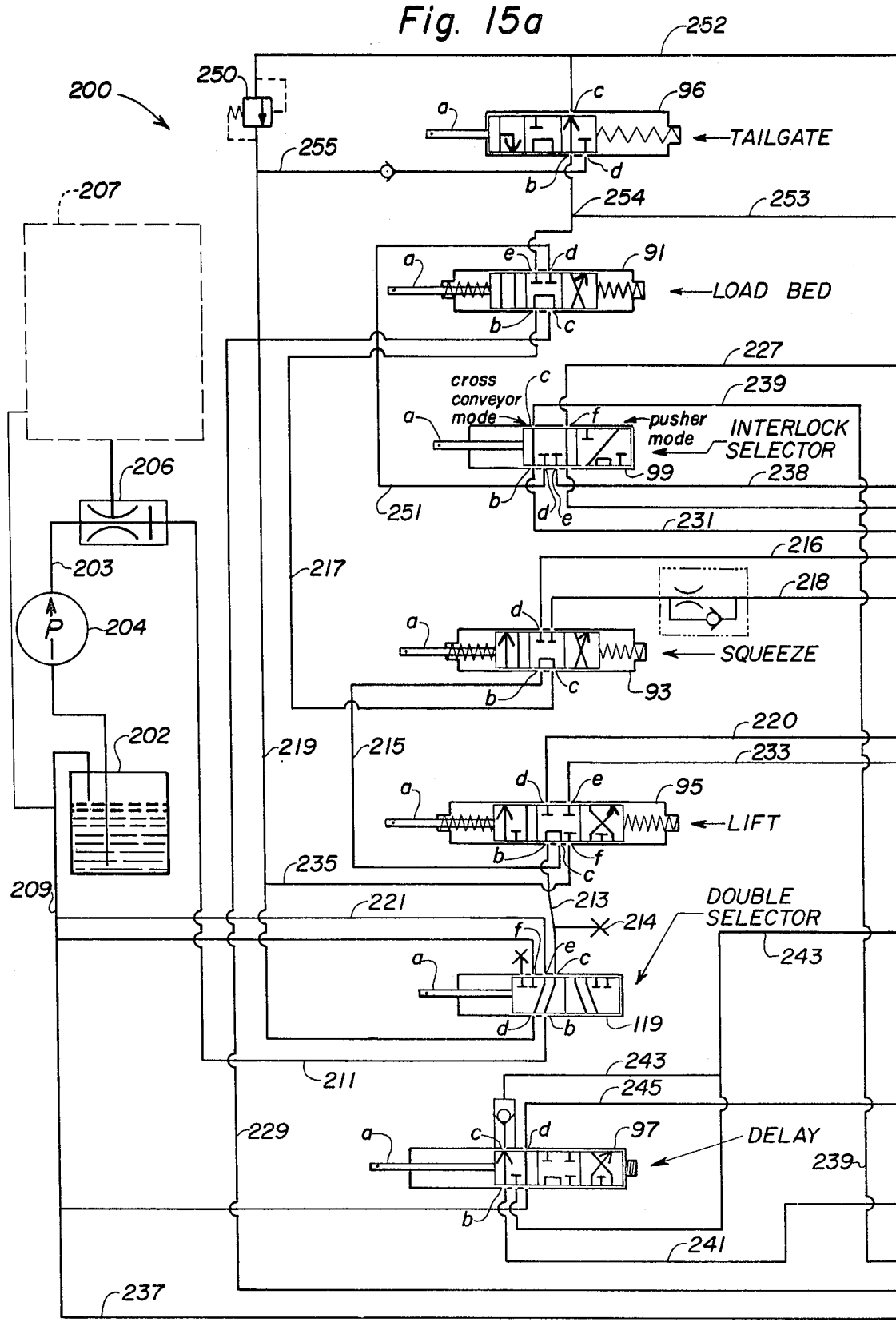

INTERLOCK SELECTOR CONTROL VALVE FOR ROUND BALE WAGON

BACKGROUND OF THE INVENTION

The present invention relates generally to vehicles for the handling of material or articles, which are self-loading or unloading and includes successive handling means, and, more particularly, to an interlock selector valve for the hydraulic system of a round bale wagon that is operable to select the operation of the bale handling apparatus and to provide a hydraulic interlock for the operation of the load bed to unload accumulated bales.

The evolution of the hay industry in recent years indicates a diversification in baling, storing and transporting the hay with a strong trend toward using larger bales. Large round bales, varying in weight from about 800 pounds to about 1600 pounds and varying in diameter from about four feet up to about eight feet, are rapidly replacing the relatively smaller conventional square bales.

Due to the large size of the round bales, there is a need for equipment which can pick up the bales in the field, accumulate a load of bales, and transport them to a remote storage area where the accumulated bales can be unloaded. Also, such equipment must be flexible in the ability to deal with bales ranging in diameter from the aforesaid four to eight feet. Furthermore, it is important that the bale handling equipment be able to arrange and control the position of bales on the transporter bed after the bales have been picked up. Transporting larger loads of bales reduces fuel usage and the time required for bale handling.

Currently known round bale handling equipment is limited in being able to successfully pick up, accumulate, transport and unload large loads of round bales, e.g., eight to ten bales, and cope with the varying bale size. Some equipment is available for handling large loads of bales but this equipment is tractor drawn and is thus limited by tractor speed and reduced maneuverability. Other equipment available is self-propelled, such as a pickup truck attachment for handling large round bales. While this other equipment avoids the speed and maneuverability limitations of tractor drawn equipment, it sacrifices the economic advantages associated with transporting a large number of bales.

Since the large round bales present a substantial package of crop material to be handled, it is necessary that the load bed be of rather substantial size. The tilting of the load bed to unload bales therefrom could seriously damage the bale handling and loading mechanisms having significantly less mass and size. Accordingly, it would be desirable that the bale handling mechanisms be in a non-interferring position when the forward end of the load bed is raised to unload the bales.

SUMMARY OF THE INVENTION

It is an object of this invention to overcome the aforementioned disadvantages of the prior art by providing an interlock selector valve for the hydraulic system on a round bale wagon that provides a hydraulic interlock for the operation of the load bed to unload the bales.

It is another object of this invention to provide a mechanism that would prevent the tilting of the load bed to unload bales therefrom unless the bale handling mechanism were in a non-interferring position.

It is still another object of this invention to provide a control valve that both selects the operation of the bale handling apparatus and provides for a hydraulic interlock for the operation of the load bed.

It is a further object of this invention to provide a control valve for the hydraulic system on a round bale wagon for the alternate selection of the operation of a cross conveyor and a pusher mechanism and for the provisions of a hydraulic interlock to the operation of the load bed to unload bales therefrom, which is durable in construction, inexpensive of manufacture, carefree of maintenance, facile in assemblage, and simple and effective in use.

These and other objects are accomplished according to the instant invention by providing a control valve for the hydraulic system of a round bale wagon wherein the valve spool is selectively positionable between a cross conveyor mode and a pusher mode and also provides a hydraulic interlock for the operation of the load bed to pivotally rotate for the unloading of bales therefrom. The movement of the valve spool between the cross conveyor and pusher modes effects a selection of the operation of the bale handling mechanism to either convey bales laterally across the load bed or rearwardly on the load bed. The provision of the hydraulic interlock prevents the operation of the load bed to pivotally rotate the forward end above the frame of the bale wagon and unload accumulated bales therefrom, unless both the cross conveyor and the bale pickup are in a position that would not interfere with the movement of the load bed and, therefore, prevent damage thereto. Although the pusher advance mechanism could be in an interferring position with respect to the tilting load bed, the massive size of these two members prevents any substantial damage should they impact with one another; however, the pusher advance mechanism is positionable in a non-interferring position relative to the load bed.

BRIEF DESCRIPTION OF THE DRAWINGS

The advantages of this invention will become apparent upon consideration of the following detailed description of the invention, especially when taken in conjunction with the accompanying drawings wherein:

FIG. 3 is a somewhat simplified fragmentary plan view of the mobile chassis of the round bale wagon seen in FIG. 1 with the load bed removed, revealing the control valves for the cylinders highlighted in FIGS. 1 and 2 and the mechanical linkages for actuating the control valves;

FIG. 4 is a cross-sectional view showing the single lever control for both the hydraulic squeeze and lift functions of the pickup mechanism taken along lines 4—4 of FIG. 3;

FIG. 5 is a cross-sectional view showing the control panel in the cab of the round bale wagon taken along lines 5—5 of FIG. 4;

FIG. 6 is an enlarged fragmentary plan view, corresponding to a portion of FIG. 3, with portions broken away to highlight the control linkage for effecting an automatic cycling of the bale handling mechanisms, the over-center linkage being shown in its open position;

FIG. 7 is an enlarged fragmentary plan view corresponding to a portion of FIG. 6 and showing the over-center linkage in its closed position, with the open position being shown in phantom;

FIG. 8 is an elevational detail view corresponding to lines 8—8 of FIG. 7 and showing the over-center linkage in its closed position;

FIG. 9 is an elevational detail view corresonding to FIG. 8 with the over-center linkage being shown in the open position, as taken along lines 9—9 of FIG. 6, but on an enlarged scale;

FIGS. 15a and 15b are combinable halves of a schematic diagram of the hydraulic system of the round bale wagon seen in FIGS. 1 and 2, FIGS. 15a and 15b being combinable along the dashed match line at the right of FIG. 15a and on the left of FIG. 15b.

DESCRIPTION OF THE PREFERRED EMBODIMENT

Figure 1:
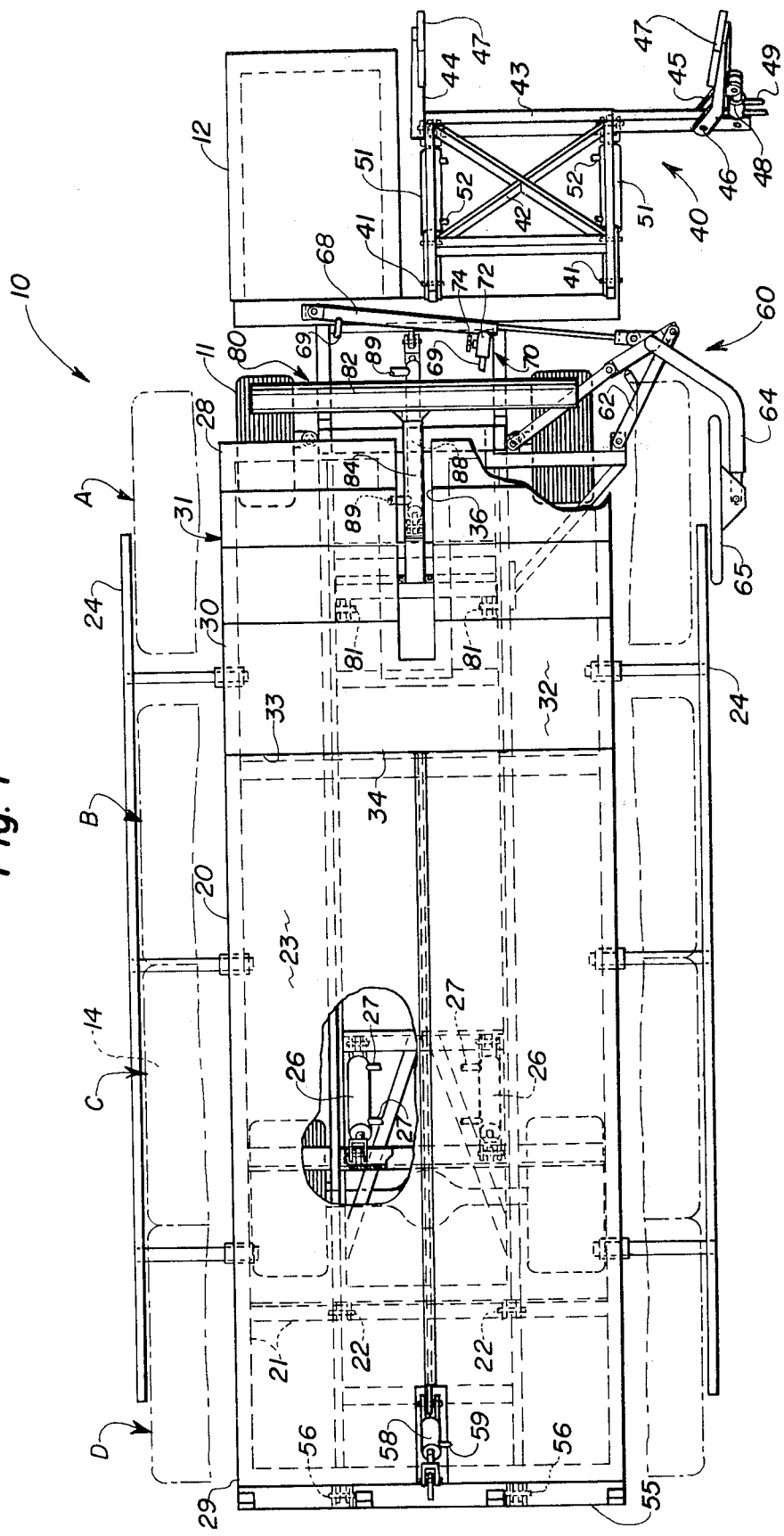
FIG. 1 is a top plan view of a round bale wagon incorporating the principles of the instant invention with portions broken away to reveal the hydraulic cylinders of the bale handling system.

Referring now to the drawings and, particularly, to FIG. 1, a plan view of a round bale wagon incorporating the principles of the instant invention can be seen. Left and right references are used as a matter of convenience and are determined by standing at the rear of the machine facing the forward end, the direction of travel. A general description of the machine depicted in the drawings can be found in co-pending U.S. Ser. No. 161,719. This bale wagon is of the self-propelled type; however, the primary source of power and some of the drive mechanism have been removed to simplify the drawing for purposes of clarity.

GENERAL STRUCTURE OF PREFERRED EMBODIMENT

The round bale wagon 10 is designed to pick up and transport large round bales, such as processed by the apparatus disclosed in U.S. Pat. No. 3,827,223. The round bale wagon 10 has the ability to function as an off-highway agricultural vehicle capable of good maneuverability and low speed for picking up round bales, yet transport over the road from field to field. The round bale wagon 10, depicted in the drawings, can handle approximately eight-six foot diameter round bales or 10-four foot diameter round bales.

The round bale wagon 10 includes a wheeled frame 11 on which is mounted an operator's cab 12, offset to the left side and at the forward end of the wagon 10 for good visibility during both operation and transport. A load bed 20 includes a sub-frame 21 pivotally connected at pivot 22 to the frame 11 and supporting a floor 23. The load bed 20 is provided with side rails 24 which are laterally adjustable to accommodate different sized bales 14 and for minimizing the width of the wagon 10 during transport. A pair of hydraulic cylinders 26 operatively interconnect the wheeled frame 11 and the frame 21 of the load bed 20 to selectively effect a pivotal movement of the load bed 20 about the pivot 22 relative to the frame 11 to move the forward end 28 of the load bed 20 above the frame 11 and the rearward end 29 closer to the ground G for the discharge of bales 14 from the load bed 20. The hydraulic cylinders 26 are connected through hoses 27 to a hydraulic system that can be actuated by controls located in the cab 12, as will be described in further detail later.

A load rack 30 is positioned at the forward end of the load bed 20 to provide a means for guiding and retaining round bales 14 loaded thereon. The load rack 30 includes a forwardly positioned recessed cradle portion 31 for receiving round bales 14 deposited thereon by the pickup mechanism 40 and for guiding round bales 14 conveyed by the cross conveyor means 60, as will be described below. The load rack 30 also includes a raised planar portion 32 extending rearwardly from the recessed cradle portion 31 and terminating in an edge 33 raised above the floor 23 to form a stop 34 to prevent bales 14 positioned in row B from moving forwardly and interfering with the positioning of bales 14 in row A on the recessed cradle portion 31. A slot 36 is also provided in the load rack 30 for the operation of the pusher advance means 80, also further described below.

A bale pickup means 40 includes a subframe 42, which is pivotally connected at pivot 41 to the wheeled frame 11 adjacent the forward end 28 of the load bed 20 and to the right of the cab 12. The bale pickup 40 is pivotally movable in the fore-and-aft direction about pivot 41 and is operable to pick up a round bale 14 lying on the ground G, and to despoit it in the recessed cradle portion 31 of the load rack 30 immediately rearwardly thereof. The subframe 42 includes a cross member 43 interconnecting two forwardly extending arms 44, 45. The cross member 43 can be telescopically constructed so as to be selectively adjustable to vary the distance between the two forwardly extending arms 44, 45 to accommodate various size bales 14.

The forwardly extending arm 44 is fixed with respect to the cross member 43 and includes an enlarged pad-like member 47 for engaging a substantially planar side of a round bale 14. The other forwardly extending arm 45 is pivotally connected at pivot 46 to the cross member 43 to be movable toward and away from the fixed arm 44. The pivotal movement of the squeeze arm 45 is effected by a hydraulic cylinder 48, which is connected to the central hydraulic system by the hose 49. The squeeze arm 45 also includes a pad-like member 47 for engaging a substantially planar side of a round bale 14.

Figure 2:
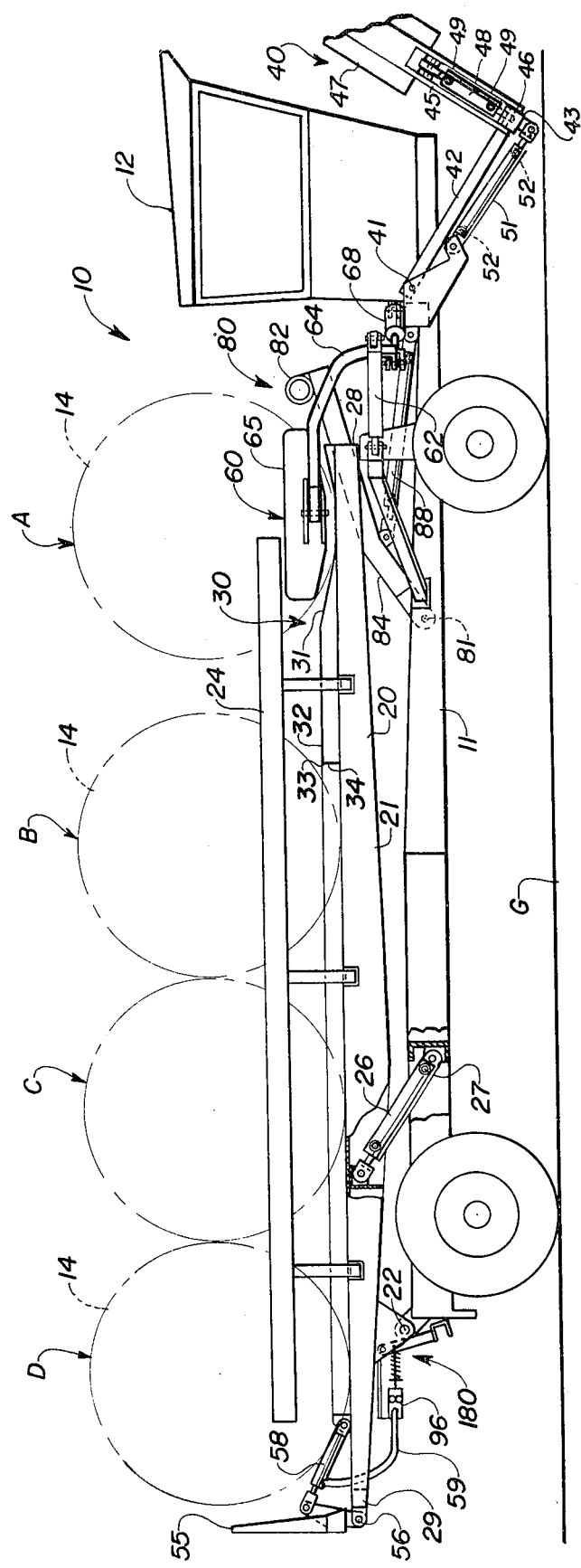
FIG. 2 is a side elevational view of the round bale wagon seen in FIG. 1 with portions broken away to highlight the locations of the hydraulic cylinders.

A pair of hydraulic cylinders 51, connected to the central hydraulic system by the hose connection 52, operably interconnect the subframe 42 of the bale pickup means 40 and the main frame 11 of the round bale wagon 10 for pivotally moving the bale pickup means 40 between a pickup position, seen in FIGS. 1 and 2, wherein a bale 14 is engaged between the forwardly extending arms 44, 45 while still on the ground G, and a loading position, wherein the bale pickup means 40 deposits a round bale 14 in the recessed cradle portion 31 in row A immediately rearwardly of the bale pickup means 40. The hydraulic cylinder 48 is operable to pivotally move the squeeze arm 45 toward any away from the fixed arm 44 so as to releasably squeeze a round bale 14 therebetween, enabling the bale pickup means 40 to pick up a round bale 14 off the ground G and deposit it in the recessed cradle portion 31.

At the rearward end 29 of the load bed 20 a tailgate 55 is pivotally connected to the frame 21 of the load bed 20 at pivot 56. A hydraulic cylinder 58, connected to the central hydraulic system by means of the hose connection 59, is connected between the load bed 20 and the tailgate 55 and is operable to pivotally move the tailgate 55 between an upright position seen in FIG. 2, wherein the round bales 14 in row D are prevented from rolling off the load bed 20, and an extended position, not shown, wherein the round bales 14 are permitted to roll off the load bed 20 over the tailgate 55. A further explanation of the function and operation of the tailgate can be found below.

A cross conveyor means 60 is provided for laterally moving a round bale 14 in a row A along the recessed cradle portion 31 from a position immediately rearwardly of the bale pickup means 40 to a position immediately rearwardly of the cab 12 and is described in greater detail in co-pending U.S. Ser. No. 187,012. In general, a linkage 62 pivotally interconnects the main frame 11 and a cross conveyor arm 64, which has a frame-like member 65 mounted thereon for engaging a round bale 14 and moving it laterally along the recessed cradle portion 31. The cross conveyor means 60 is operatively powered by a hydraulic cylinder 68, that is in operative communication with the central hydraulic system via the hose connection 69, and interconnects the main frame 11 and the cross conveyor linkage 62 to cause the frame-like member 65 to engage a round bale 14 and move it laterally across the recessed cradle portion 31 before returning to the outboard, home position.

Figure 13:
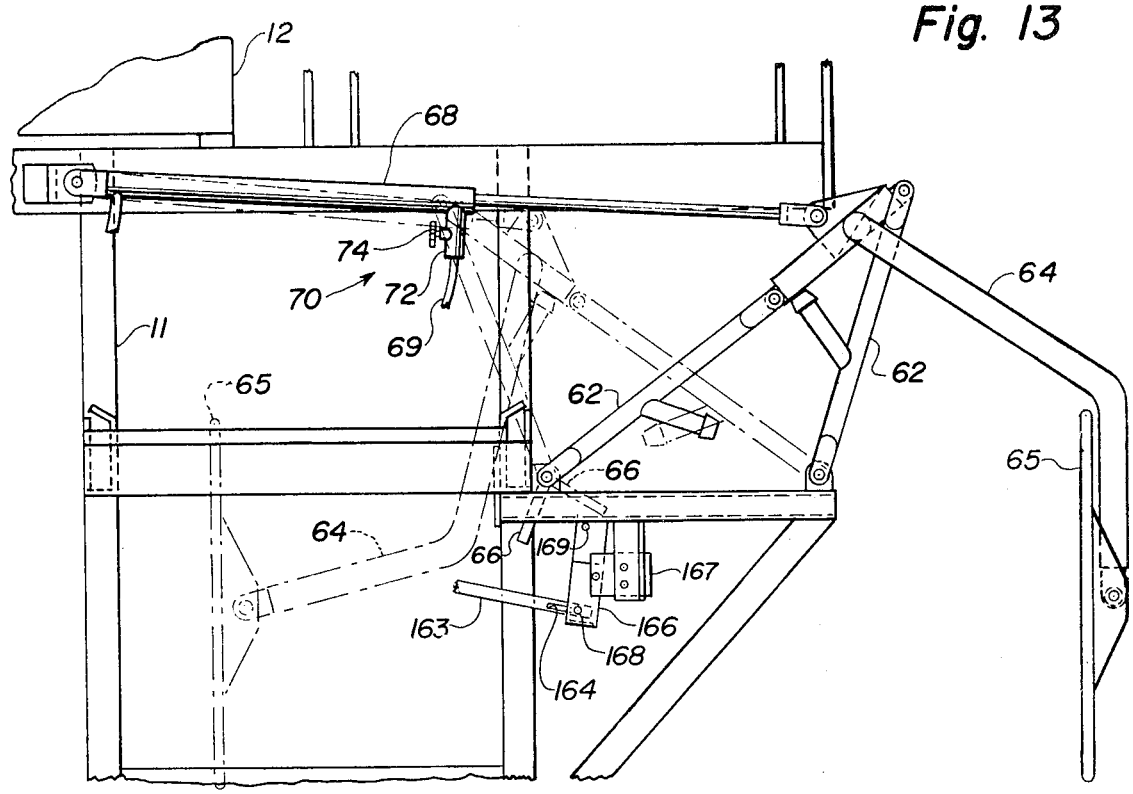
FIG. 13 is a fragmentary plan view of the cross conveyor showing the valve for locking the cross conveyor in an inboard transport position.

The cross conveyor means 60 is provided with a retaining means 70, which is operable to hold the cross conveyor arm 64 and attached frame-like bale engaging member 65 in a position inboard of the side rails 24, so as to reduce the overall width of the round bale wagon 10 during transport thereof over public roads. The retaining means 70 is depicted in FIGS. 1 and 13 in the form of a valve 72 in operative communication with the hose 69. The valve 72 seen in FIGS. 1 and 13 includes a manual shut off control 74; however, one skilled in the art will readily realize that other similar devices, such as a solenoid valve, could be substituted. The valve 72 is operable to prevent the flow of hydraulic fluid through the hose 69 to or from the hydraulic cylinder 68 and, thereby, prevent the hydraulic cylinder 68 from pivotally moving the cross conveyor linkage 62. Accordingly, if the valve 72 is closed after the hydraulic cylinder 68 has moved the cross conveyor arm 64 and attached bale engaging member 65 inboard of the side rails 24, the cross conveyor means 60 will be locked at that inboard position to minimize the transport width of the wagon 10.

A pusher advance means 80 is pivotally connected to the main frame 11 at pivot 81 and is operable to advance round bales 14 rearwardly from row A, positioned in the recessed cradle portion 31, over the raised planar portion 32 of the load rack 30 to row B rearwardly thereof. The bale pusher mechanism 80 includes a transverse pusher bar 82 fixed to a support arm 84, which in turn is pivotally connected to the main frame 11 at pivot 81. The transverse pusher bar 82 is of sufficient size to engage all of the round bales 14 in row A and advance them rearwardly to row B. Although not shown in the drawings, the transverse pusher bar 82 can be constructed to be telescopically adjustable to accommodate various sized bales 14 being loaded into recessed cradle portion 31. The pusher advance means 80 is operatively powered by a hydraulic cylinder 88 interconnecting the main frame 11 and the support arm 84. The hydraulic cylinder 88 is connected to the central hydraulic system by means of hose connections 89.

GENERAL OPERATION OF THE PREFERRED EMBODIMENT

In operation, the round bale wagon 10 is maneuvered over the ground surface G until a round bale 14 is positioned between the forwardly extending arms 44, 45 of the bale pickup means 40 with the planar ends of the cylindrical round bale 14 positioned adjacent to the respective forwardly extending arms 44, 45. The squeeze arm 45 is then pivotally moved by manipulation of the hydraulic cylinder 48 until both the fixed arm 44 and the squeeze arm 45 have engaged the sides of the round bale 14 and is squeezed therebetween. Manipulation of the hydraulic cylinder 51 pivotally rotates the bale pickup means 40 until the bale 14 is positioned in the recessed cradle portion 31 of the load rack 30 immediately rearwardly thereof. Subsequent manipulation of the hydraulic cylinder 48 to move the squeeze arm 45 away from the fixed arm 44 releases the round bale 14 and deposits it on the load rack 30.

After the round bale 14 has been deposited in the recessed cradle portion 31 of the load rack 30 rearwardly of the bale pickup means 40, the hydraulic cylinder 68 is manipulated to cause the cross conveyor means 60 to laterally move the round bale 14 across the recessed cradle portion 31 from a position immediately rearwardly of the bale pickup means 40 to a position immediately rearwardly of the cab 12. Upon the return of the cross conveyor arm 64 and the attached bale engaging member 65 to the outboard, home position, a second bale can be picked up by the bale pickup means 40 and deposited in the recessed cradle portion 31, at which point, the recessed cradle portion 31 of the load rack 30 would be filled.

A manipulation of the hydraulic cylinder 88 to effect a rotation of the support arm 84 about the pivot 81, causes the transverse pusher bar 82 to engage the bales 14 in row A and advance them rearwardly over the planar portion 32 of the load rack 30 until positioned in row B. After the pusher advance means 80 has returned to its home position, as seen in FIGS. 1 and 2, the bale pickup means 40 can deposit another bale on the recessed cradle portion 31 of the load rack 30 to initiate another cycle to ultimately fill the recessed cradle portion 31 with round bales 14 in row A. At this time the pusher advance means 80 is actuated again to advance the bales in row A rearwardly to row B, causing the bales 14 previously in row B to move rearwardly to row C. This sequence is repeated until all rows A, B, C and D are filled with round bales 14.

The bale wagon 10 is then driven to a selected storage area where the load of bales 14 is dumped by actuating the hydraulic cylinder 26 to pivot the load bed 20 about the pivot 22. The tailgate 55 is preferably maintained in the upright position seen in FIG. 2 until the forward end 28 of the load bed 20 is sufficiently high above the frame 11 to impart sufficient energy to the bales 14 to allow them to easily slide or roll off the floor 23 of the load bed 20. At this time, the hydraulic cylinder 58 is actuated to cause the tailgate 55 to pivotally move from its upright position to an extended position and permit the round bales 14 to freely move off the load bed 20.

Although the description above is directed to the drawings depicting a load of four rows of round bales 14 positioned two across in each row, one skilled in the art would readily realize that smaller or larger sized bales 14 would likely result in more or less rows of bales. Furthermore, one skilled in the art should also realize that some modification to the linkages and controls described herein could be made to provide rows of bales having one, two or more bales in each row.

HYDRAULIC SYSTEM CONTROL LINKAGE

From the description of the operation of the bale wagon 10 above, it should be noted that a number of hydraulically powered devices sequentially operate to fully load and subsequently discharge the load bed 20 with round bales 14. Although each hydraulic cylinder having a function in this sequential flow of events could have a separate control lever located in the cab 12 for manipulation by the operator, it is desirable that a single control lever be used to operate all the hydraulic functions of the loading process. Accordingly, FIGS. 3 through 13 depict a control linkage 90 for mechanically sequentially controlling the lateral cross conveying of the bales 14 along the recessed cradle portion 31 of the load rack 30 and the rearward advance of the bales from the load rack 30 by the pusher advance means 80 in conjunction with the raising and lowering of the bale pickup means 40.

Referring now to FIGS. 3, 4, 5 and 6, a partial cross sectional view of the bale wagon 10 through the cab 12 and beneath the load bed 20 to reveal the hydraulic control linkage 90 can be seen. Each respective hydraulic cylinder 26, 48, 51, 58, 68 and 88 has a separate control valve connected by hoses 27, 49, 52, 59, 69 and 89, respectively, to control the operation thereof. Control valve 91 is connected to hydraulic cylinder 26 via hose 27 to control the tilting of the load bed 20 about the pivot 22. Control valve 93 is connected to hydraulic cylinder 48 via hose 49 to control the manipulation of the squeeze arm 45.

Control valve 95 is connected to hydraulic cylinder 51 via hoses 52 to control the lifting of round bales 14 from the ground G to deposit them on the recessed cradle portion 31 of the load rack 30 via the pivotal rotation of the pickup subframe 42 about the pivot 41. Control valve 96 is connected to hydraulic cylinder 58 via hose 59 to control the operation of the tailgate 55. Control valve 97 is situated within the hydraulic circuit to effect a delay of the operation of the cross conveyor means 60 until the bale pickup means 40 has rotated forwardly a sufficient distance to prevent interference therebetween. Control valve 99 is operable to control the operation of both the cross conveyor means 60 and the pusher advance means 80 via a sequential manipulation of hydraulic cylinders 68 and 88, as will be described in further detail below.

A single lever 100 is located within the cab 12 for control of both the lift and squeeze functions of the bale pickup means 40. Lever 100 is rotatably mounted upon shaft 101 and extends upwardly through a slot 102 having quadrants n, l, o, c and r in a control panel 103 within the cab 12. A connecting link 105 interconnects the control lever 100 with a cross link 106 interconnecting control valves 93 and 95. As best seen in FIG. 4, the valves 93 and 95 are mounted on the main frame 11 in a spaced relationship to one another. The connecting link 105 is connected to the cross link 106 at a point closer to valve 93 than to valve 95. Accordingly, manipulation of the lever 100 will effect a movement of the spool 93a in control valve 93 before effecting a movement of spool 95a in control valve 95 when moving from the neutral position.

Referring again to FIGS. 3, 4 and 5, movement of the lever 100 from the neutral position at quadrant 102-n to quadrant 102-o would cause a corresponding movement of the control link 105 and effect a movement of spool 93a and operate the hydraulic cylinder 48 to move the squeeze arm 45 away from the fixed arm 44. A further movement of lever 100 to quadrant 102-l would finally effect a movement of spool 95a and manipulate the hydraulic cylinder 51 and lower the bale pickup means 40 into a position to engage a bale 14 on the ground G. As can be seen in FIG. 15 and as described in further detail below, movement of spool 95a from its neutral position to either its innermost or outermost position shuts off the flow of fluid to control valve 93 and "freezes" the hydraulic cylinder 48 in whatever position it is in until spool 95a is returned to the center, neutral position, whereupon fluid flow returns to valve 93 for manipulation of hydraulic cylinder 48.

A subsequent movement of the lever 100 to quadrant 102-c would first return spool 95a to its neutral position, then return spool 93a to its neutral position, by virtue of the spring loading of valve spools 93a and 95a, and finally effect a movement of the spool 93a to cause a hydraulic cylinder 48 to move the squeeze arm 45 toward the fixed arm 44 and clamp or squeeze a bale 14. A further movement of lever 100 to quadrant 102-r would then effect movement of spool 95a to cause the hydraulic cylinder 51 to rotate the subframe 42 of the bale pickup means 40 about the pivot 41 and deposit the clamped bale 14 in the recessed cradle portion 31 of the load rack 30. Movement then of lever 100 to quadrant 102-o would again cause movement of spools 93a and 95a, as noted above, to manipulate hydraulic cylinder 48 and release the bale 14 and start another cycle for the bale pickup means 40.

Referring now to FIGS. 3 and 5, control lever 110 is also rotatably mounted on shaft 101 and extends upwardly through a slot 112 having quadrants 112-n, 112-l and 112-r in the control panel 103. Control lever 110 is connected through links 114 directly to valve 91, such that a manipulation of the lever 110 between quadrants 112-n and 112-l or 112-r will cause a movement of the spool 91a to effect the operation of hydraulic cylinder 26 to pivotally rotate load bed 20 about pivot 22 and lower and raise, respectively, the forward end 28 to dump the load of the bales 14 therefrom.

Control lever 115 is pivotally mounted to the cab 12 and extends upwardly through a slot 117 in the control panel 103. Control lever 115 is connected via a connecting link 118 directly to a double selector valve 119, whose sole function is to divert hydraulic fluid to or from the control valves noted above. Movement of control lever 115 to the stop position as seen in FIG. 5, causes the valve 119 to divert oil from the pump directly back to the reservoir without being circulated to any of the valves noted above. Further reference can be made to FIGS. 15a and 15b, wherein a schematic diagram of the hydraulic system is shown.

AUTOMATIC CONTROL LINKAGE

Referring now to FIGS. 3 and 6, the control linkage 120 for automatically manipulating the movements of the cross conveyor means 60 and pusher advance means 80 can be seen. Manipulation of the control valve 99 to selectively effect operation of the hydraulic cylinders 68 and 88 is controlled through the movements of the pickup subframe 42 about the pivot 41 when the bale pickup means 40 alternates between a lowered bale pickup position and a raised bale loading position.

Figure 10:
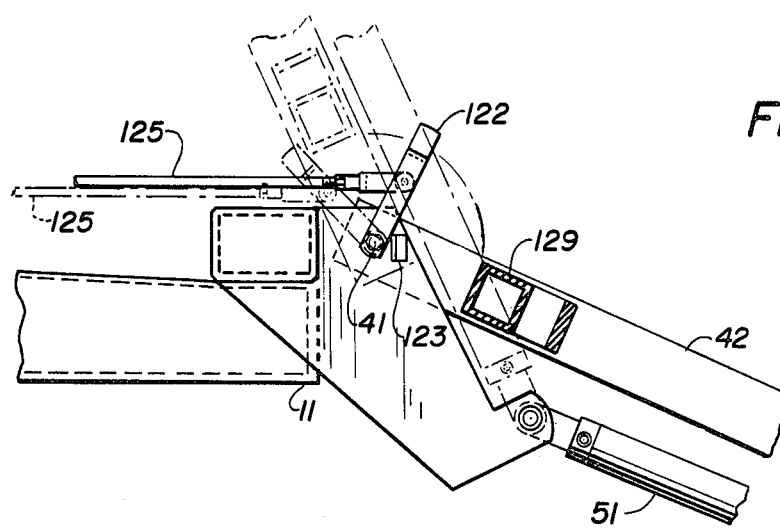
FIG. 10 is an elevational detail view taken along lines 10—10 of FIG. 6 and showing the control linkage that is actuated by the bale pickup mechanism.

As can be best seen in FIGS. 6 and 10, a trip 122 is rotatably connected to pivot 41 and is movable independently of the pickup subframe 42. A stop 123 mounted on the main frame 11 limits the amount of movement of the trip 122 in a forward direction. A connecting link 125 is connected to the trip 122 and extends rearwardly therefrom through a mounting bracket 126 for connection to the spool 97a of delay valve 97. A spring 127 biases the connecting link 125 to urge the trip 122 in a forward direction against the stop 123. Connecting link 125 is shown in FIG. 6 to be of a known two piece construction with spring 128 providing protection for valve 97 in case the connecting link 125 is moved rearwardly further than the spool 97a can move.

When the bale pickup means 40 rotates rearwardly to deposit a bale 14 on the load rack 30, the pickup subframe 42 rotates about pivot 41 and causes the subframe member 129 to engage the trip 122. Further rotative movement of the subframe 42 rearwardly causes the cross member 129 to move the trip 122 rearwardly, as best seen in FIG. 10, and effect a corresponding movement of the connecting link 125. This movement provides for the sequential operation of both the cross conveyor means 60 and the pusher advance means 80 through the associated linkages and valves as further described below.

The automatic linkage 120 includes a first link 131 pivotally connected at one end at pivot 132 to the main frame 11 and at point 133 intermediate its ends to the spool 99a for actuation thereof between a pusher mode and a cross conveyor mode. The first link 131 is pivotally connected at pivot 134 to a second link 135. The second link 135 is connected to both the spool 97a and the connecting link 125 at point 136 intermediate its ends. As can best be seen in FIGS. 8 and 9, the second link 135 has a free end 137 that projects through a guide slot 138 in a bracket 139 to be engageable with an over-center mechanism 140.

The over-center mechanism 140 is best seen in FIGS. 6–9. In general, the function of the over-center mechanism 140 is to control the movement of the free end 137 of the second link 135, which in turn controls the actuation of the control valve 99 between the pusher and cross conveyor modes, as will be described in detail below. A fixed stop 142 is positioned adjacent the guide slot 138 of the bracket 139 so as to restrict the movement of the free end 137 of the second link 135 in a rearward direction. The fixed stop 142 is depicted in the drawings in the form of a bolt 143 adjustably mounted in a bracket 144.

The over-center mechanism 140 is rotatably mounted about an axis defined by the shaft 145. A movable stop 147 is fixedly attached to the shaft 145 and rotatable therewith between an open position 148, as seen in FIGS. 6 and 9, in which the movable stop 147 is spaced somewhat from the free end 137 of the second link 135, and a closed position 149, as seen in FIGS. 7 and 8, in which the movable stop 147 is positioned adjacent to the free end 137 of the second link 135 to trap it against the fixed stop 142 and prevent it from moving within the guide slot 138.

An over-center link 151 is pivotally connected at pivot 152 to the movable stop 147 and also connected at the opposing end 153 to a spring 154. The spring 154, which is attached to the main frame 11, biases the movable stop 147 from either side of the axis of rotation defined by the shaft 145, depending upon the position of the over-center link 151. When the movable stop 147 is in the open position 148, the spring 154 urges the movable stop 147 toward the open position 148 by reason that the line of force exerted by the spring 154 passes to the right of the shaft 145. When the movable stop 147 is moved into the closed position 149, the line of force exerted by the spring 154 is to the left of the shaft 145 and, therefore, urges the movable stop 147 into the closed position 149. The over-center link 151 is curved to permit the line of force exerted by the spring 154 to be positioned on either side of the shaft 145 depending upon the position of the movable stop 147. The bracket 139 and the elongaged member 156 serve as limits to the amount of movement of the movable stop 147 between the open position 148 and the closed position 149.

To actuate the movement of the movable stop 147 from the open position 148 to the closed position 149, a first actuating means 160 operatively communicates between the over-center mechanism 140 and the cross conveyor linkage 62. A first arm 162 is affixed to the shaft 145 and rotatable therewith, so that there is no relative movement between the first arm 162 and the movable stop 147. A first actuating link 163 pivotally interconnects the first arm 162 and a first trip means 165.

Figure 11:
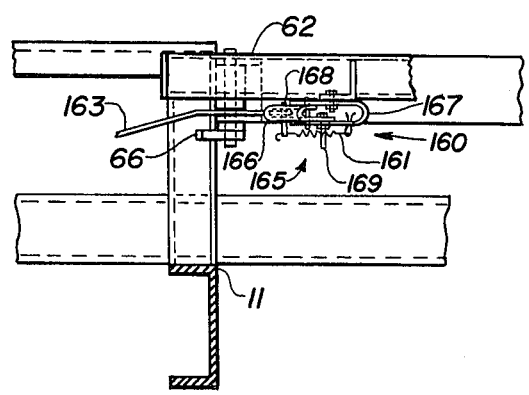
FIG. 11 is an elevational detail view of the control linkage actuated by the cross conveyor as taken along lines 11—11 of FIG. 6.
Figure 12:
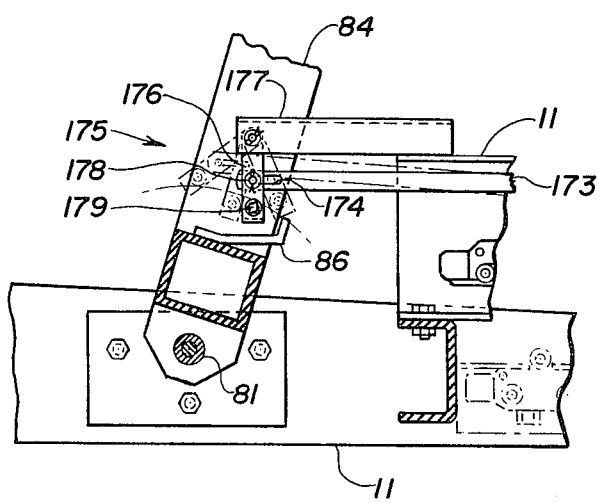
FIG. 12 is an elevational detail view taken along lines 12—12 of FIG. 6 and showing the control linkage actuated by the bale pusher mechanism.

The first trip means 165 is best seen in FIGS. 6, 11 and 13 and includes an elongated pivot bar 166 pivotally connected to a bracket 167 mounted on the main frame 11. The pivot bar 166 is connected to the first actuating link 163 by a pin 168 that rides within the lost motion slot 164. The spring 161 biases the pivot bar 166 in a counterclockwise direction, as viewed in phantom in FIG. 6. The pivot bar 166 further includes a trip pin 169 projecting from the plane of the pivot bar 166 for engagement with a trip arm 66 connected to the cross conveyor linkage 62. Although the operation of the first actuating means 160 will be described in further detail below, the trip arm 66 engages the trip pin 169, when the cross conveyor means 60 returns to the outboard, home position after conveying a round bale 14 along the recessed cradle portion 31, to pivotally rotate the pivot bar 166 in a counterclockwise direction, as seen in FIG. 6, and causse a corresponding movement of the first actuating link 163 to the right and, therefore, rotate the over-center mechanism 140 and place the movable stop 147 in the closed position 149.

To actuate the movement of the movable stop 147 from the closed position 149 to the open position 148, a second actuating means 170 is provided. The second actuating means 170 is best seen in FIGS. 6, 7, 8, 9 and 12. A second arm 17 is affixed to the shaft 145 and rotatable therewith, such that there is no relative movement between the second arm 172 and the movable stop 147. A second actuating link 173 pivotally interconnects the second arm 172 and a second trip means 175.

The second trip means 175 includes a pivot link 176 pivotally connected to a bracket 177 mounted on the main frame 11. The pivot link 176 is connected to the second actuating link 173 by a pin 178 riding within the lost motion slot 174 in the link 173. The pivot link 176 further includes a trip pin 179 projecting from the pivot link 176, so as to be engageable with a trip arm 86 affixed to the pusher advance means 80. Although the operation of the second actuating means will be described in further detail below, in general, the trip arm 86 engages the trip pin 179 when the pusher advance means 80 returns to the forward, home position and effects a forward movement of the second actuating link 173 to rotate the over-center mechanism 140 so as to move the movable stop 147 from the closed position 149 to the open position 148.

OPERATION OF THE CONTROL LINKAGES

To initiate the operation of the round bale wagon 10 to pick up round bales 14 lying on the ground G and load them on the load bed 20, the mechanism described above must be cycled so that the bale engaging member 65 on the cross conveyor arm 64 of the cross conveyor means 60 is positioned at its outboard, home position to the right side of the load bed 20 and the pusher advance means 80 is positioned such that the pusher bar 82 is at its rearwardmost position, while the bale pickup means 40 is in a pickup position adjacent the ground G ready to engage a round bale 14. The round bale wagon 10 is then guided so that the pickup means is positioned adjacent the first bale 14 to be loaded with the fixed arm 44 and the squeeze arm 45 adjacent opposing substantially planar sides of the cylindrical round bale 14.

The operator would then move the control lever 100 to slot quadrant 102-c to actuate the control valve 93, through the connecting link 105 and cross link 106, as described above, and cause the hydraulic cylinder 48 to move the squeeze arm 45 toward the fixed arm 44 and firmly engage the round bale 14 therebetween. The operator would then move the control lever 100 to slot quadrant 102-r whereby the control valve 95 would be actuated to cause the hydraulic lift cylinders 51 to rotate the pickup frame 42 about the pivot 41 and, thereby, raise the engaged round bale 14 to a position in the recessed cradle portion 31 of the load rack 30 immediately rearwardly of the bale pickup means 40.

As will be seen through the description of the sequential cycling of the linkage as found below, the starting position described above would result in the over-center mechanism 140 being positioned such that the movable stop 147 is in its closed position 149. As the pusher advance means 80 returns to its home position, as described above with respect to FIG. 12, the trip arm 86 engages the second trip means 175 to cause the second actuating link 173 to move forwardly, rotating the over-center mechanism 140 about the shaft 145 and positioning the movable stop 147 into the open position 148.

As the frame 42 of the bale pickup means 40 rotates upwardly about the pivot 41, as described above with respect to FIG. 10, the subframe member 129 engages the trip 122 and causes the connecting link 125 to move rearwardly. Since the free end 137 of the second link 135 is limited in its rearward movement by the fixed stop 142, the entire linkage 120, including the first link 131 and the second link 135, pivots about the free end 137 of the second link 135, thereby pushing both spools 97a and 99a inwardly. Although the operation of the hydraulic system is described in further detail below, this inward movement of spool 99a causes the control valve 99 to shift into the cross conveyor mode.

When the frame 42 of the bale pickup means 40 is rotated downwardly about pivot 41, the biasing spring 127 causes the connecting link 125 to move forwardly until the trip 122 engages the stop 123. Since the movable stop 147 of the over-center mechanism 140 has been moved into the open position 148 by the operation of the second actuating means 170, the free end 137 of the second link 135 is free to slide forwardly within the guide slot 138 of the bracket 139. As a result, the spool 97a of the delay valve 97 is pulled into its outward position and the second link 135 pivots about the connection 134 without affecting any movement of the first link 131 or the spool 99a. Value 97 is operable to delay movement of the cross conveyor means 60 when the spool 97a is in its inward position until the pickup means 40 has rotated forwardly out of interference with the frame-like member 65 and, thereby, moving the spool 97a to its outermost position to permit the hydraulic cylinder 68 to be actuated.

Since the control valve 99 is in the cross conveyor mode, for the reasons described below with respect to the description of the hydraulic system, the hydraulic cylinder 68 retracts to cause the bale engaging member 65 on the cross conveyor arm 64 to engage the bale 14 positioned within the recessed cradle portion 31 by the bale pickup means 40 and slide it across the load rack 30 to a position immediately rearwardly of the cab 12. When the over-center mechanism 140 was rotated to cause the movable stop 147 to move to its open position 148, the first actuating link 163 of the first actuating means 160 was pulled to the left such that the pin connection 168 with the first actuating link 163 was positioned at the right end of the lost motion slot 164. Accordingly, when the cross conveyor means 60 slides the bale 14 across the recessed cradle portion 31, the trip arm 66 engages the trip pin 169 to pivotally move the pivot bar 166 and slide the pin 168 within the lost motion slot 164 without causing any movement to the first actuating link 163. After the trip arm 66 has moved past the trip pin 169, the biasing spring 161 returns the pivot bar 166 to a position where the pin 168 is again located at the right end of the lost motion slot 164.

When a second bale 14 has been engaged by the bale pickup means 40 between the fixed arm 44 and the squeeze arm 45, the hydraulic lift cylinders 51 are again actuated to cause the pickup frame 42 to rotate upwardly about the pivot 41. As will be described below with respect to the description of the hydraulic system, the positioning of spool 95a to cause the hydraulic lift cylinders 51 to rotate the bale pickup means 40 upwardly automatically causes the cross conveyor means 60 to return to its outboard, home position with the frame-like bale engaging member 65 along the right side of the load bed 20.

The movement of the cross conveyor linkage 62 to its home position causes the trip arm 66 to engage the trip pin 169 and pivotally rotate the pivot bar 166 in a counterclockwise direction, as viewed in FIG. 6, thereby causing the pin 168 to move the first actuating link 163 to the right to rotate the over-center mechanism 140 so that the movable stop 147 is positioned in the closed position 149. As described above, the upwardly rotative movement of the pickup frame 42 about the pivot 41 causes the subframe member 129 to engage the trip 122 and move the connecting link 125 rearwardly, causing the spool 97a to move to its inward position. Since the spool 99a is already in its inward position and, therefore, in the cross conveyor mode, movement of the spool 99a would not be affected.

After the second bale 14 has been deposited in the recessed cradle portion 31 of the load rack 30 by the bale pickup means 40, the spool 95a is manipulated to cause the hydraulic lift cylinders 51 to rotate the pickup frame 42 downwardly about the pivot 41. As the pickup frame 42 rotates downwardly, the biasing spring 127 pushes the connecting link 125 forwardly until the trip 122 engages the stop 123. Since the free end 137 of second link 135 is now trapped between the fixed stop 142 and the movable stop 147, the forward movement of the connecting link 125 causes the second link 135 to pivot about its free end 137, thereby causing the pivotal connection 134 between the first link 131 and the second link 135 to move forwardly and, therefore, pivot the first link 131 about its pivotal connection 132 with the frame 11 and move the spool 99a outwardly so as to shift the control valve 99 into the pusher mode.

As will be described in further detail below, the movement of the control valve 99 to the pusher mode and the disengagement of the delay valve 97 permits the hydraulic cylinder 88 to be actuated, causing the pusher advance means 80 to move the round bales 14 from row A to row B. When the over-center mechanism 140 was rotated to position the movable stop 147 in its closed position 149, the second actuating link 173 was moved rearwardly such that the pin 178 connecting the second actuating link 173 with the pivot link 176 is at the forward end of the lost motion slot 174. The movement of support arm 84 rearwardly about the pivot 81 causes the trip arm 86 to engage the trip pin 179 and rotate pivot link 176 rearwardly. However, the pin 178 is free to move rearwardly within the lost motion slot 174 until the trip arm 86 is disengaged from the trip pin 179; whereupon the pivot link 176 is free to rotate by gravity until the pin 178 is again at the forward end of the lost motion slot 174 for subsequent engagement by the trip arm 86 to move the second actuating link 173 forwardly and rotate the over-center mechanism 140. At this point, the bale wagon 10 is at the starting position as described above. Further recycling of the events enumerated above will finally result in the load bed 20 being filled with round bales 14.

STRUCTURE AND OPERATION OF THE TAILGATE

Once the load bed 20 is filled with round bales 14, the wagon 10 is driven to a selected location where the bales 14 are to be stored. To empty the load of bales from the load bed 20, the operator moves the control lever 110 to slot quadrant 112-r and, thereby, moving the connecting link 114 forwardly to shift the spool 91a of the control valve 91 and actuate the hydraulic cylinders 26 and rotate the frame 21 of the load bed 20 about its pivotal connection 22 with the main frame 11, raising the forward end 28. It should be noted that a hydraulic interlock is provided so that the forward end 28 of the load bed 20 cannot be raised unless both the cross conveyor 60 and the pusher advance means 80 are cycled to their respective home positions and the bale pickup means 40 is lowered to a position where the pusher advance means 80 just begins to move rearwardly.

Figure 14:
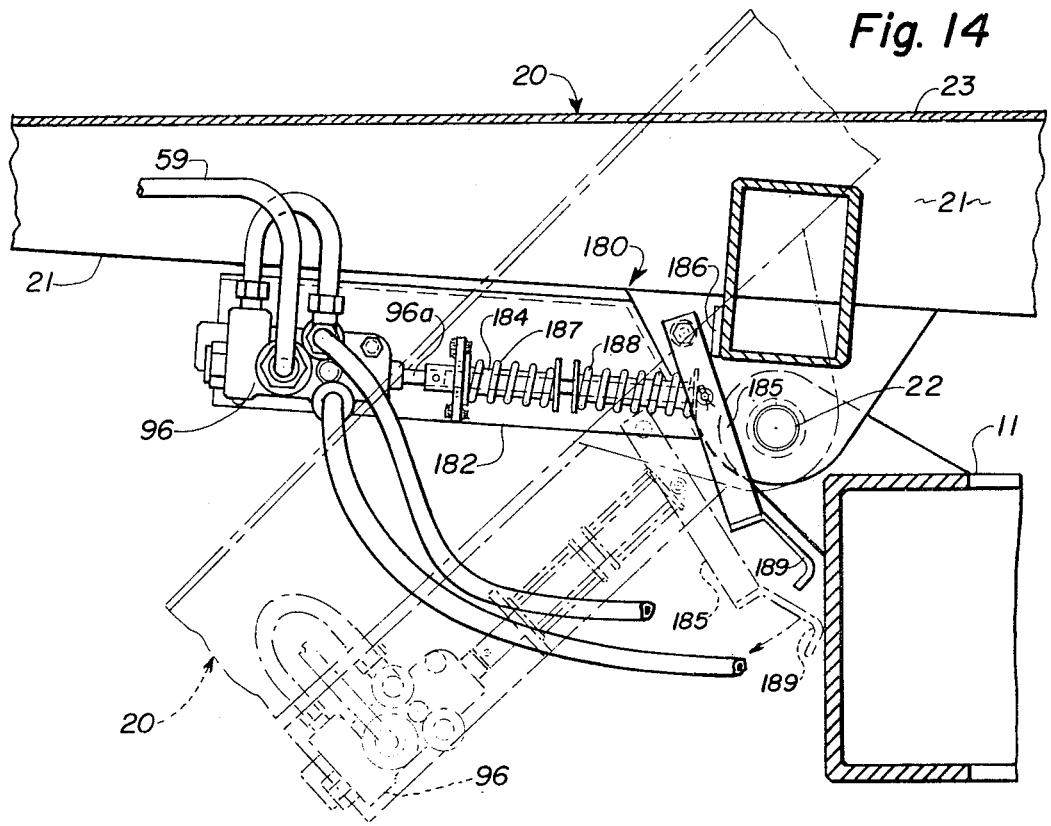
FIG. 14 is a partial elevational view taken along lines 14—14 of FIG. 3 and showing the control valve and linkage for automatically actuating the tailgate.

It is desirable that the tailgate 55 remains in its upright position with respect to the load bed 20, as seen in FIG. 2, until the load bed 20 is positioned at an approximate 35 degree angle with respect to the main frame 11, at which time the tailgate 55 should release to permit the round bales 14 to slide and/or roll off. Referring now to FIGS. 2, 3 and 14, the actuating mechanism 180 for automatically releasing the tailgate 55 from its upright position can be seen.

The actuating mechanism 180 includes a bracket 182 mounted to the frame 21 of the load bed 20 to be movable therewith and supporting the control valve 96 which is mounted thereon. An actuating link 184 interconnects the spool 96a and a pivot link 185, which is pivotally mounted on the load bed frame 21. The actuating link 184 is of a two piece construction, similar to the connecting link 125, and includes both a biasing spring 187 and a protection spring 188, as well as being pivotally connected to the pivot link 185. The biasing spring 187 pivotally rotates the pivot link 185 forwardly into engagement with the stop 186. The pivot link 185 also includes a trip member 189 affixed thereto and extending for engagement with the main frame 11.

In operation, when the hydraulic cylinders 26 are actuated to cause the forward end 28 of the load bed 20 to rotate upwardly, the trip member 189 engages the main frame 11 and causes the pivot link 185 to rotate relative to the frame 21 of the load bed 20. As a result, the actuating link 184 ultimately shifts the spool 96a to actuate the hydraulic cylinder 58 and rotate the tailgate 55 about its pivotal connection 56 with the load bed 20. The length of the actuating link 184 and the position of the trip member 189 relative to the frame 11 permit the spool 96a to shift and, thereby, actuate the hydraulic cylinder 58, when the load bed 20 has been raised to an angle of approximately 35 degrees relative to the main frame 11. Retaining the tailgate 55 in its upright position until the load bed 20 has been raised to approximately this point prevents the bales 14 from moving until they have sufficient height to freely and easily move off the load bed 20.

HYDRAULIC SYSTEM

Figure 15B:
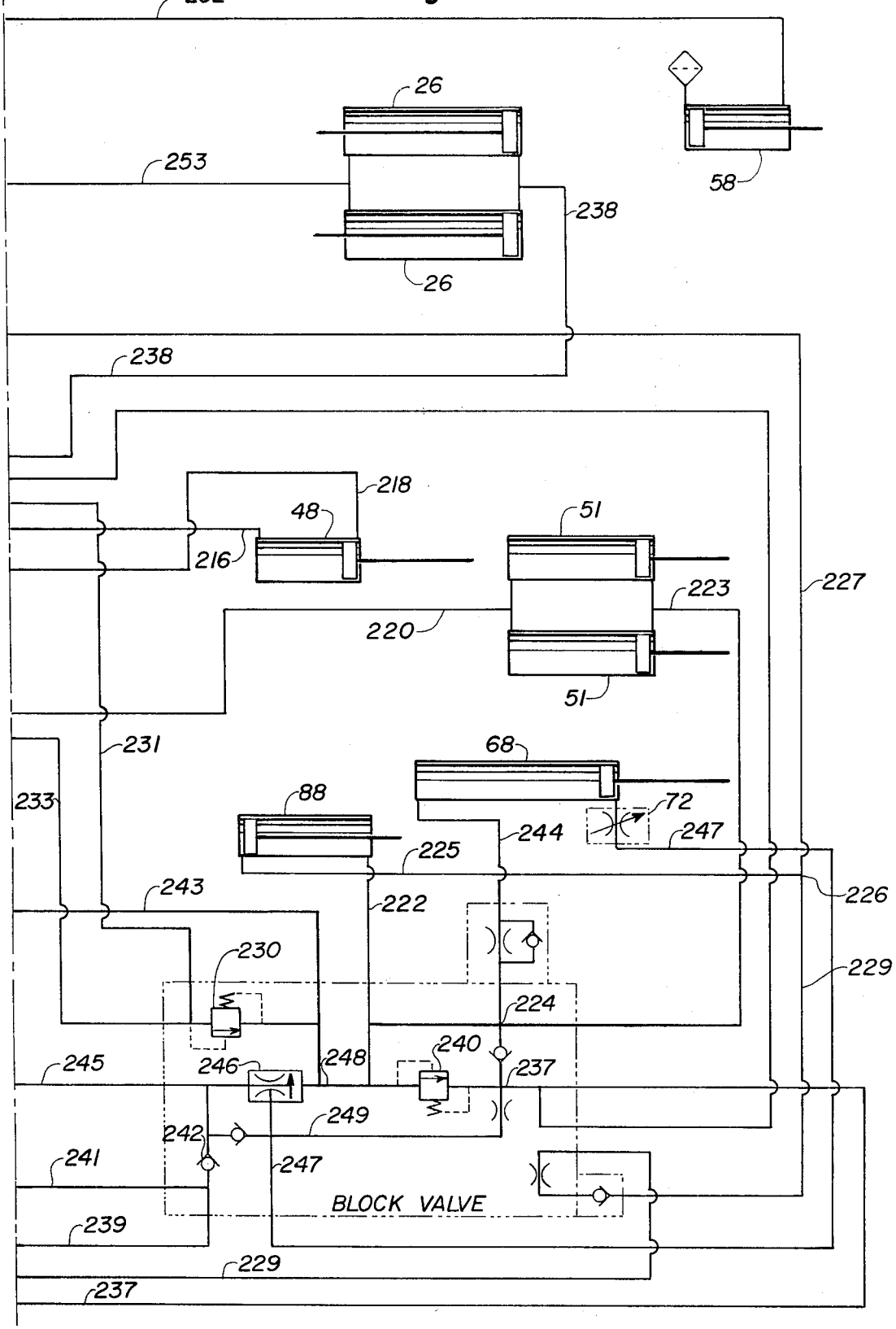

Referring now to FIGS. 15a and 15b, a somewhat simplified schematic diagram of the hydraulic system for the round bale wagon 10 can be seen. Valves 91, 93 and 95, operating the load bed 20, the squeeze arm 45 and the pickup means 40, respectively, have three position spools and are spring loaded to the central, neutral position. Valves 96 and 97, corresponding to the tailgate 55 and the delay for the cross conveyor means 60, respectively, are shown as having three position spools which are spring loaded to be biased in one direction only. Valves 99 and 119 need only have two position spools, without any spring bias, so as to be only externally actuatable. Hydraulic cylinders 26, 48, 51, 58, 68 and 88 are schematically shown in FIG. 15b. It should be noted that FIGS. 15a and 15b are combinable along a match line located along at the right of FIG. 15a and at the left of FIG. 15b.

The central hydraulic system 200 includes a reservoir 202 containing a supply of hydraulic fluid and a pump 204 which places the fluid under pressure through the inlet line 203 as the primary source of power for the components in the hydraulic system 200. A flow divider 206 draws fluid from the inlet line 203 to provide power for an assortment of hydraulically powered devices, such as power steering, which are diagrammatically shown as being housed in box 207. A return manifold 209 collects the hydraulic fluid after being circulated and returns it to the reservoir 202 to complete the circuit.

Hydraulic fluid flows initially through line 211 to the double selector valve 119. The position of the valve spool 119a is manually controlled by the operator through manipulation of control lever 115 and connecting link 118. If the valve spool 119a is shifted out, the oil flows from port 119b to port 119f and directly back to the return manifold 209 without being circulated to any of the other valves. When the valve spool 119a is shifted in, as depicted in FIG. 15a, the oil flows from port 19b to port 119c and then onwardly through line 213, after passing through a pressure check 214, to port 95b of valve 95. Simply stated, the double selector valve 119 operates only to divert the flow of hydraulic fluid to or away from the remaining valves.

When the valve spool 95a is in the central, neutral position, fluid flows into port 95b and back out port 95c and through line 215 to port 93b of valve 93. When valve 93 is in the central, neutral position, fluid flows into port 93b and back out port 93c and onward through line 217 to port 91b of valve 91. When valve spool 91a is in the central, neutral position, fluid flows into port 91b and back out port 91c through line 219 to port 119d, then through valve spool 119a, out port 119e and through line 221 back to the return manifold 209. It is from this basic flow pattern that the various hydraulic cylinders are operated.

It should be noted that, with reference to FIG. 4, movement of the connecting link 105 in either a forward or rearward direction will always actuate valve 93 before actuating valve 95; however, because both valve spools 93a and 95a are spring loaded to the central, neutral position, valve spool 93a will not shift from an extreme inward position to an extreme outward position until both valve spools 95a and 93a have moved to the central, neutral position. For example, when control lever 100 is in slot quadrant 102-n both valve spools 93a and 95a are in the neutral position. When control lever 100 is shifted to slot quadrant 102-c, valve spool 93a is shifted to the innermost position to operate hydraulic cylinder 48 through lines 216 and 218, while valve spool 95a remains in the neutral position. As noted above and further described below, hydraulic fluid will not flow to the valve 93 unless valve spool 95a is in the neutral position. Accordingly, when control lever 100 is shifted from slot quadrant 102-r back to 102-n valve spool 95a moves to the central, neutral position, followed by valve spool 93a moving to the central, neutral position, at which time hydraulic fluid can flow on to the hydraulic cylinder 48 through the valve 93 because valve 95 is then in the neutral position.

With reference to the starting position as enumerated above, the bale pickup means 40 has been lowered with the pusher advance means 80 in its rearwardmost position. Control lever 100 is positioned in slot quadrant 102-c shifting the valve spool 93a to its innermost position and causing hydraulic fluid to flow from port 93b to port 93d and onwardly to the hydraulic cylinder 48 to extend it and move the squeeze arm 45 toward the fixed arm 44. Movement of control lever 100 to slot quadrant 102-r shifts spool 95a to its innermost position to cause hydraulic fluid to flow from port 95b to port 95d and onwardly through lines 220 to the hydraulic lift cylinders 51 to cause extension thereof and rotate the subframe 42 about the pivot 41.

Hydraulic fluid leaving hydraulic cylinders 51 flows through line 223 to the cross connection 224. The fluid then flows through line 222 to retract the hydraulic cylinder 88 because of the flow path available at the cross connection 224, line 222 presenting the path of least resistance. Hydraulic fluid leaving hydraulic cylinder 88 through line 225 proceeds to the T connection 226 and becomes divided to flow through both lines 227 and 229. Hydraulic fluid flowing through line 229 ultimately returns back to port 119d of valve 119, exiting port 119e and returning via line 221 to the return manifold 209. Hydraulic fluid flowing through line 227 enters port 99f of valve 99 and exits port 99b, because valve 99 has been positioned in its outermost position, which is the pusher mode, via the automatic linkage 120.

Hydraulic fluid will then flow from port 99b to a pressure relief valve 230 via line 231 and back to port 95e via line 233, whereupon the flow exits valve 95 at port 95f, then flows through line 235 to line 219 and ultimately back to the return manifold 209. Once the hydraulic cylinder 88 has been completely retracted, fluid flowing from the cross connection 224 through the line 222 builds up sufficient pressure to open the relief valve 240 to permit the fluid to flow through line 237 and back to the return manifold 209.

It should be noted that the block valve, as labeled at the bottom of FIG. 15b, has no specific function other than to house a multitude of check valves, orifices, relief valves, a flow divider and T connections. These various hydraulic parts would normally have individual housings and be distributed throughout the system; however, it has been found to be convenient to house them in one central location. It has been found that with an open center hydraulic system, as depicted in FIGS. 15a and 15b, having a pump that will deliver a flow of 30.5 gallons per minute to provide a pressure of 2,000 pounds per square inch along line 211 to the double selector valve 119, setting the relief valve 230 at 1,900 pounds per square inch provides relief for the system when either the cross conveyor means 60 or the pusher advance means 80 has been advanced to its respective extreme position by the hydraulic cylinder 68 and 88, respectively, while setting the relief valve 240 at 1,000 pounds per square inch provides adequate relief for the system when either the cross conveyor means 60 or the pusher advance means 80 reaches the respective home position.

With regard to the operation of valve 97 to effect a delay in the operation of the cross conveyor means 60, it should be noted that whenever the connecting link 125 has been moved rearwardly by the engagement between member 129 and the trip 122, thereby shifting spool 97a to its innermost position, the valve spool 95a is necessarily at its innermost position to effect an extension of the hydraulic cylinders 51. Hydraulic fluid is flowing from the double selector valve 119 to port 95b and exiting port 95e to travel through line 233 to relief valve 230. The flow of hydraulic fluid continues from the relief valve 230 through line 231 to port 99b, exiting port 99c, because the automatic linkage 120 always shifts valve spool 99a to its innermost position when the connecting link 125 is moved rearwardly, to flow through line 239 and line 241 to port 97b of the delay valve 97, due to the positioning of the check valve 242.

By exiting the fluid through port 97c, the delay valve diverts hydraulic fluid away from hydraulic cylinder 68 through line 243 into the block valve and back out through line 223 to the hydraulic cylinders 51 to cause retraction thereof and lower the bale pickup means 40. Fluid leaving the hydraulic cylinders 51 returns through the line 220 to port 95d, exiting port 95f, because the valve spool 95a has been shifted to its outermost condition by the control lever 100 being positioned in slot quadrant 102-l, to travel through line 235 to line 219 and back to the return manifold 209 through valve 119.

Once the bale pickup means 40 has been lowered to a position whereby the valve spool 97a is shifted to its outermost position, hydraulic fluid arriving at valve 97 through line 241 enters port 97b and exits port 97d to flow through line 245 into a flow diverter 246 located in the block valve. The flow diverter 246 permits fluid to flow through line 247 and the manual shut-off valve 72 to the hydraulic cylinder 68 to cause a retraction thereof and actuate the cross conveyor means 60 to slide a bale 14 across the recessed cradle portion 31.

Hydraulic fluid leaving the hydraulic cylinder 68 returns over lines 244 and 223 to the hydraulic cylinders 51, to continue operation thereof to lower the bale pickup means 40, and ultimately back to the return manifold through lines 220, 235, 219 and 221. The flow diverter 246 also permits hydraulic fluid to flow directly to the hydraulic cylinders 51 over line 248, through the cross connection 224 and line 223. Hydraulic fluid can pass through line 249 to line 237 and back to the return manifold 209, to relieve pressure in line 247 when there is no flow in line 244. When the hydraulic cylinder 68 has reached the end of its retraction stroke, the relief valve 230 opens to permit hydraulic fluid to flow directly from line 233 to line 248 and via line 223 to the lift cylinders 51.

The hydraulic cylinders 26 for pivotally raising the forward end 28 of the load bed 20 can only be actuated through valve 91 when both valves 93 and 95 are in the central, neutral position and the interlock selector valve 99 has its spool 99a positioned at its outermost position, the pusher mode. Hydraulic fluid entering valve 91 via line 217 from valve 93 enters port 91b and exits port 91d, by reason that valve spool 91a has been moved to its outermost position through placement of the control level 110 in slot quadrant 112-r. Fluid exiting toward 91d flows through line 251 into port 99d, exiting port 99e, by reason that valve 99 is in the pusher mode, and travels through line 238 to hydraulic cylinders 26 to cause extension thereof.

Fluid leaving the hydraulic cylinders 26 through line 253 arrives at the T connection 254, where the flow enters port 91e. Fluid entering port 91e exits port 91c and is returned to the return manifold 209. Relief valve 250 provides for a return of the hydraulic fluid from cylinder 58 to line 219 and ultimately the return manifold 209, if cylinder 58 becomes overloaded.

As the forward end 28 of the load bed 20 is raised and the tailgate actuating mechanism 180 shifts the spool 96a partially inwardly, hydraulic fluid entering port 96b exits port 96d and travels through line 255 to line 219 and ultimately the return manifold 209, the fluid entering port 96c is blocked off to maintain pressure to the hydraulic cylinder 58. When the load bed 20 has reached approximately a 35 degree angle with respect to the main frame 11, the valve spool 96a is shifted to its innermost position to permit hydraulic fluid to escape the hydraulic cylinder 58 through line 252 to enter port 96c and exit port 96d and ultimately to the return manifold 209, the pressure exerted on the tailgate 55 by the round bales 14 providing sufficient power for extending the hydraulic cylinder 58.

When the control lever 110 is positioned in slot quadrant 112-l, the spool 91a is shifted to its innermost position to cause a reversing of the flow of hydraulic fluid through lines 253 and 238 and cause a retraction of the hydraulic cylinder 26. When the load bed 20 has reached a position with respect to the main frame 11 that the tailgate actuating mechanism 180 permits the spool 96a to reach its outermost position, hydraulic fluid reaching the T connection 254 from the valve port 91e can enter port 96b and exit port 96c to travel through line 252 and effect a retraction of the hydraulic cylinder 58 and reposition the tailgate 55 in its upright position.

It will be understood that changes in the details, material, steps and arrangement of parts which have been described and illustrated to explain the nature of the invention will occur to and may be made by those skilled in the art upon a reading of this disclosure within the principals and scope of the invention. The foregoing description illustrates the preferred embodiments of the invention. However, concepts, as based upon such description, may be employed in other embodiments without departing from the scope of the invention. Accordingly, the following claims are intended to protect the invention broadly as well as in the specific form shown herein.

Having thus described the invention, what is claimed is:

1. In a bale wagon for picking up bales of crop material from the field, accumulating a plurality of bales and transporting the accumulated bales to a preselected storage location to be unloaded from the bale wagon, said bale wagon having a mobile frame adapted for movement across the field; a bale pickup means mounted on said frame for individually engaging bales of crop material on the ground and elevating said bales onto the bale wagon; a load bed pivotally mounted on said frame for accumulating a plurality of said bales, said load bed being pivotable relative to said main frame to raise the forward end thereof and effect an unloading of the accumulated bales; cross conveyor means mounted on said frame for conveying bales elevated onto said load bed by said pickup means, said cross conveyor means being at least partially operable over said load bed; pusher advance means mounted on said frame adjacent said load bed to position bales on said load bed, said cross conveyor means and said pusher advance means alternately operating to arrange and position bales deposited onto said load bed by said bale pickup means in a preselected manner; a hydraulic system including a first hydraulic cylinder for operatively driving said bale pickup means; a second hydraulic cylinder for operatively driving said cross conveyor means, a third hydraulic cylinder for operatively driving said pusher advance means, a fourth hydraulic cylinder for pivoting said load bed relative to said mobile frame, a plurality of control valves for controlling the flow of hydraulic fluid to said hydraulic cylinders and conduit means interconnecting the hydraulic cylinders and control valves for transporting the flow of hydraulic fluid therebetween; and power means for operatively powering said hydraulic system, the improvement comprising:

an interlock selector valve connected to said hydraulic system in operative communication with said second and third hydraulic cylinders, said interlock selector valve having a spool therein movably positionable between a cross conveyor mode and a pusher mode, hydraulic fluid being directed to said second hydraulic cylinder when said spool is in said cross conveyor mode and to said third hydraulic cylinder when said spool is in said pusher mode, said interlock selector valve having a flow path through said spool when in said pusher mode for directing hydraulic fluid to said fourth hydraulic cylinder only under conditions where said cross conveyor means and said bale pickup means are in a position that would not interfere with the pivoting of said load bed to raise the forward end thereof relative to said frame;

a first control valve in operative communication with said interlock selector valve and with said fourth hydraulic cylinder to control the flow of hydraulic fluid thereto for operation thereof to pivot said load bed relative to said frame; and a second control valve in operative communication with said first hydraulic cylinder to control the flow of hydraulic fluid thereto for operation of said bale pickup means to elevate said bales onto said load bed, said second control valve having a spool selectively movable in three positions, including a neutral position in which hydraulic fluid is not directed to said first hydraulic cylinder, said first and second control valves being in operative communication such that hydraulic fluid must pass through said second control valve before entering said first control valve.

2. The bale wagon of claim 1 wherein said conduit means includes a fluid flow line defining a flow path from said first control valve, through said interlock selector valve and to said fourth hydraulic cylinder such that hydraulic fluid flowing from said first control valve most flow through said interlock selector valve before reaching said fourth hydraulic cylinder.

3. The bale wagon of claim 2 wherein said cross conveyor mode of said interlock selector spool does not permit hydraulic fluid flowing from said first control valve to pass through said interlock selector valve to reach said fourth hydraulic cylinder for operation thereof, said pusher mode of said interlock selector valve spool having a flow path permitting the flow of hydraulic fluid to reach said fourth hydraulic cylinder.

4. The bale wagon of claim 3 wherein hydraulic fluid is permitted to flow from said second control valve to said first control valve only when said second control valve spool is in said neutral position, hydraulic fluid being diverted away from said third hydraulic cylinder when said second control valve spool is in said neutral position.

5. The bale wagon of claim 4 wherein said first control valve spool is movable between a neutral position in which hydraulic fluid is diverted back to a reservoir and an actuation position in which hydraulic fluid is directed toward said fourth hydraulic cylinder through said interlock selector valve.

6. The bale wagon of claim 5 wherein said interlock selector valve spool cannot shift into said pusher mode until said bale pickup means has moved into a position that would not interfere with the movement of said load bed, said cross conveyor being moved into a position that would not interfere with the movement of said load bed before said interlock selector valve spool is shifted to said pusher mode.

* * * * *